United States Patent [19]
Belmonte et al.

[11] Patent Number: 6,132,690
[45] Date of Patent: Oct. 17, 2000

[54] REACTOR FOR CHEMICAL REACTIONS IN TRIPHASIC SYSTEMS HAVING SUPERIMPOSED THERMAL EXCHANGE SECTIONS

[75] Inventors: Giuseppe Belmonte, San Giuliano Milanese; Vincenzo Piccolo, Paullo, both of Italy

[73] Assignees: Agip Petroli S.p.A., Rome, Italy; Institut Francais du Petrole, Rueil-Malmaison, France

[21] Appl. No.: 09/172,272

[22] Filed: Oct. 14, 1998

[30] Foreign Application Priority Data

Oct. 14, 1997 [IT] Italy .................................. MI97A2315

[51] Int. Cl.[7] ...................................................... B01J 8/22
[52] U.S. Cl. ........................... 422/193; 422/195; 422/197; 422/201
[58] Field of Search .................................... 422/197, 196, 422/201, 200, 191, 193, 140, 194, 195; 165/158, 159, 174, 104.16; 261/158

[56] References Cited

U.S. PATENT DOCUMENTS

| | | | |
|---|---|---|---|
| 2,658,728 | 11/1953 | Evans, Jr. .................. | 165/11.1 |
| 3,991,816 | 11/1976 | Klaren . | |
| 4,426,958 | 1/1984 | Hosek et al. ............... | 122/4 D |
| 4,616,698 | 10/1986 | Klaren .................. | 165/104.16 |
| 5,445,799 | 8/1995 | McCants .................. | 422/146 |

FOREIGN PATENT DOCUMENTS

| | | |
|---|---|---|
| 1059566 | 3/1954 | France . |
| 2 405 745 | 5/1979 | France . |
| 768836 | 2/1957 | United Kingdom . |
| WO 94/16807 | 8/1994 | WIPO . |

*Primary Examiner*—Jacqueline V. Howard
*Assistant Examiner*—Susan Ohorodnik
*Attorney, Agent, or Firm*—Oblon, Spivak, McClelland, Maier & Neustadt, P.C.

[57] ABSTRACT

Reactor for chemical reactions which are carried out in triphasic systems (liquid, gas, solid) which includes a bottom head into which the reagent gas is fed, through an inlet nozzle; one or more superimposed thermal exchange sections, each of these sections being immersed in the corresponding synthesis sections; a head containing outlet nozzles for discharging the suspension and outlet nozzles for discharging the non-reacted gas and a group of inclined transversal diaphragms for separating the particles of liquid and/or solid drawn therein.

4 Claims, 4 Drawing Sheets

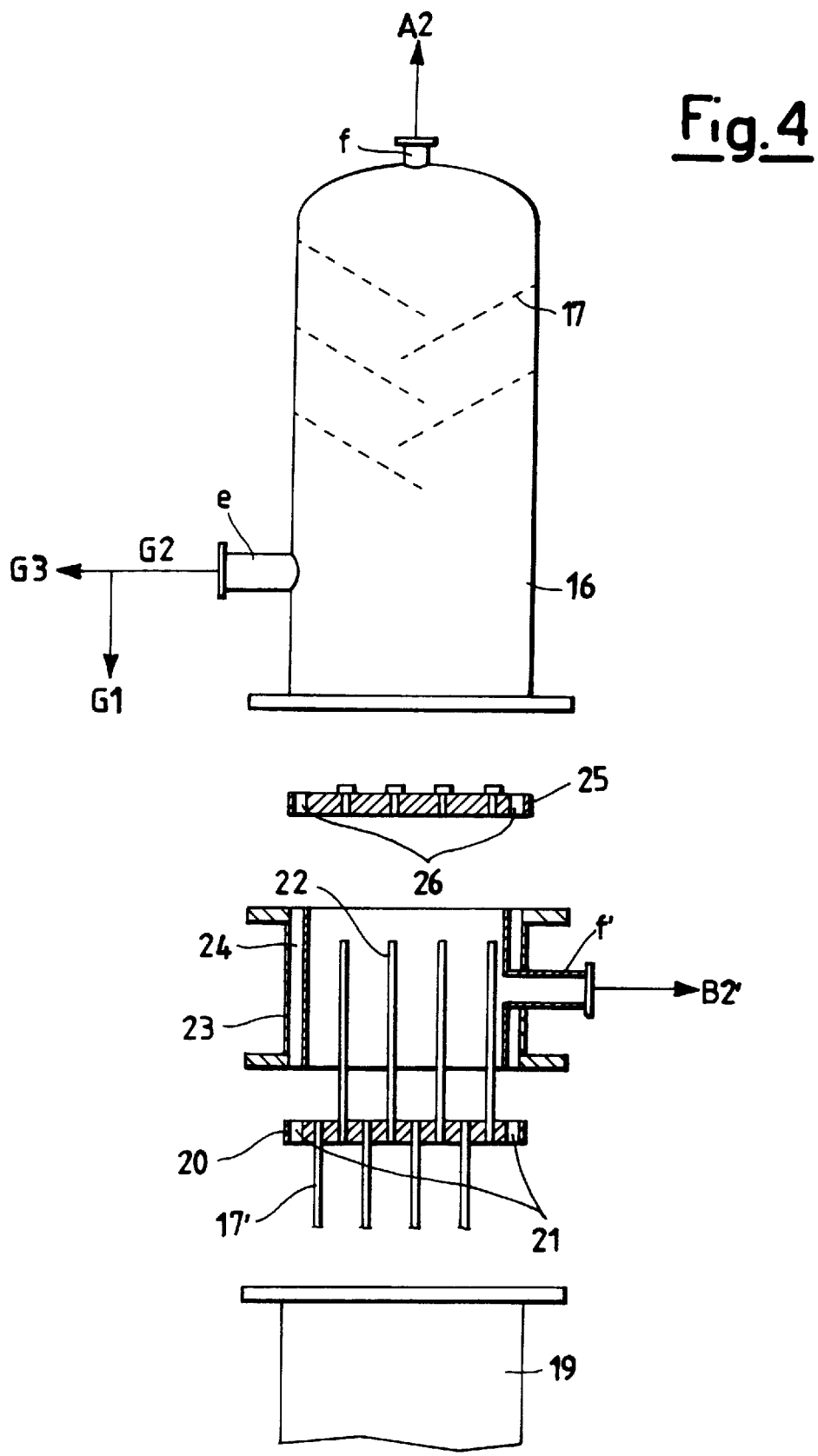

REACTOR FOR CHEMICAL REACTIONS IN TRIPHASIC SYSTEMS HAVING SUPERIMPOSED THERMAL EXCHANGE SECTIONS

BACKGROUND OF THE INVENTION

1. Field of the Invention

The present invention relates to a reactor for chemical reactions which are carried out in triphasic systems (liquid, gas, solid).

More specifically, the present invention relates to a reactor for chemical reactions which are carried out in triphasic systems wherein the gaseous phase bubbles up in a suspension of a solid in a liquid.

Even more specifically, the present invention relates to a reactor for the Fischer Tropsch synthesis which is carried out at temperatures ranging from 150 to 380° C. and at pressures of 5–50 bars.

2. Discussion of the Background

As it is known, in the Fischer Tropsch reaction, the gas phase is a mixture of hydrogen and carbon monoxide, with a molar ratio $H_2/CO$ varying from 1 to 3, the dispersing liquid phase represents the reaction product, i.e. linear hydrocarbons with a high number of carbon atoms, and the solid phase is represented by the catalyst.

The exothermicity of the Fischer Tropsch reaction (35–40 Kcal/mol) makes it indispensable to have, together with the synthesis reactor, a thermal exchange device to control the temperature, within the operating limits, and to prevent possible local "hot spots", responsible for the deterioration of the catalyst and quality of the product.

SUMMARY OF THE INVENTION

The Applicants have now found a reactor, for a Fischer Tropsch synthesis, in which the temperature control is efficiently effected by means of one or more superimposed thermal exchange sections, each of these sections being immersed in the corresponding synthesis section.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 3 and 4 each show details of a reactor having two exchange sections vertically arranged on top of each other.

DESCRIPTION OF THE PREFERRED EMBODIMENT

Figure 1:
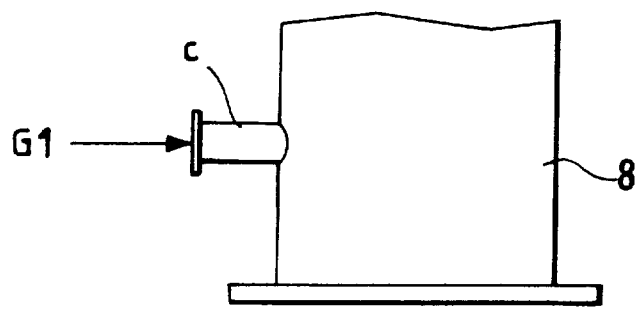
FIG. 1 shows the lower part of the reactor.
Figure 1:
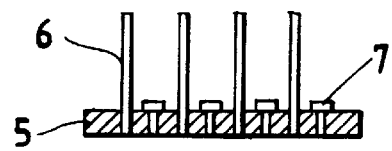
Figure 1:
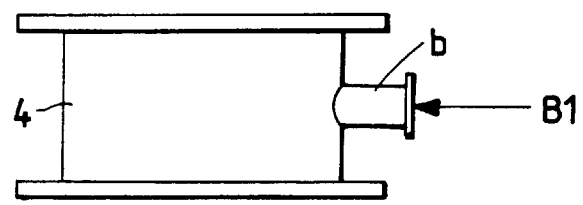
Figure 1:
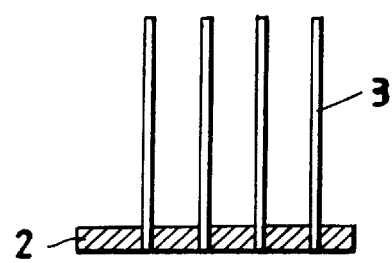
Figure 1:
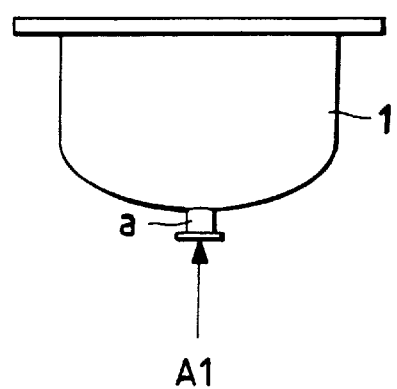
Figure 2:
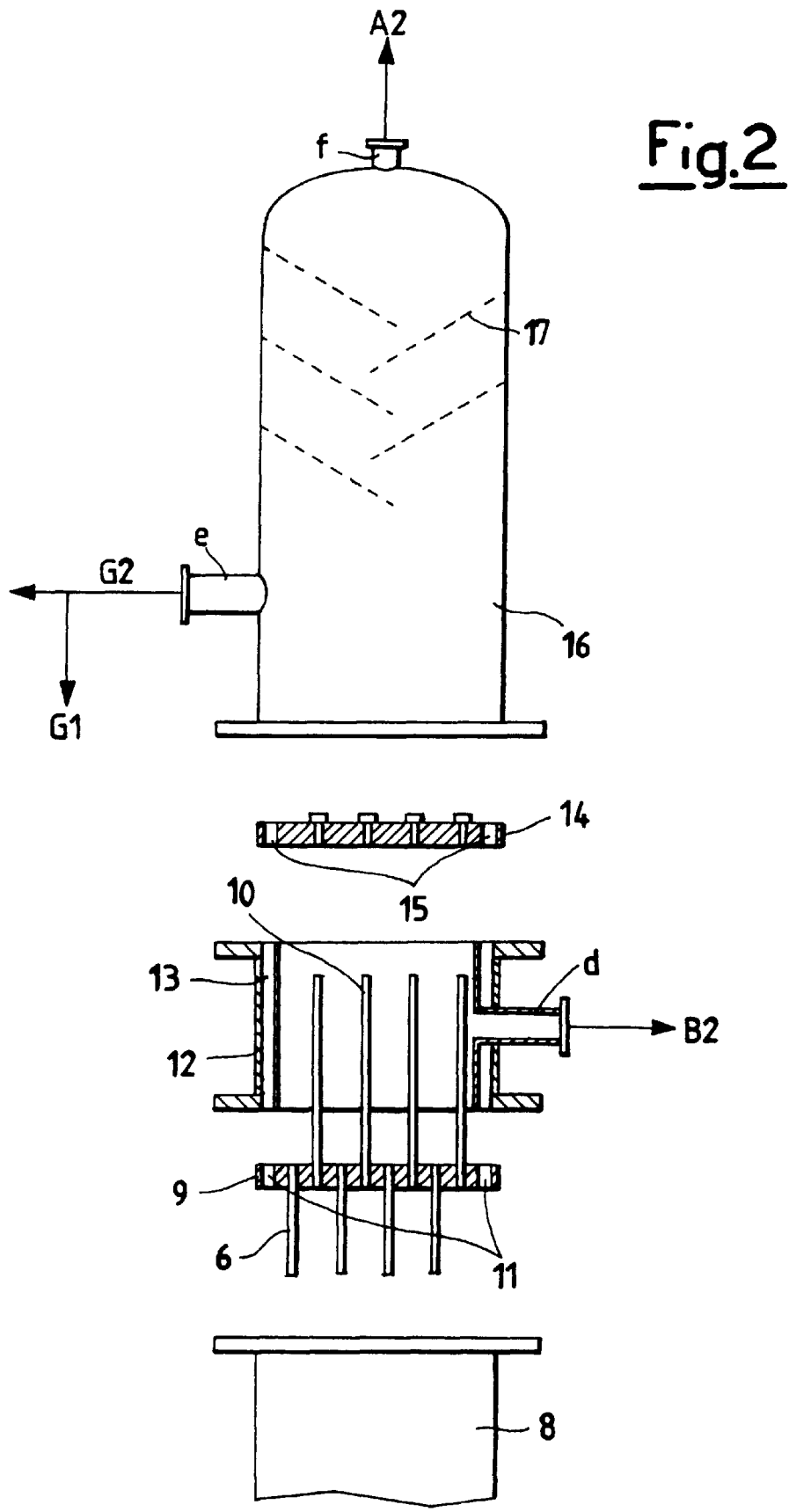
FIG. 2 shows the upper part of the reactor.

The present invention therefore relates to a reactor for chemical reactions which are carried out in triphasic systems (liquid, gas, solid) which comprises, with reference to the diagrams of FIGS. 1 and 2 which represent the lower and upper part of the reactor respectively:

i) a bottom head (1) into which the reagent gas (A1) is fed, through an inlet nozzle (a);

ii) a section comprising:

ii$_1$) a perforated plate (2), connected to the bottom head (1) by means of a flanged connection, in the holes of which tubes (3) are attached for conveying the gas to distributors (7);

ii$_2$) a cylindrical casing (4), fixed to the plate (2) by means of a flanged connection, which has one or more inlet nozzles (b) for feeding a cooling fluid (Bl) inside the tubes of a tube-bundle (6);

ii$_3$) a perforated plate (5), joined to the casing (4) by means of a flanged connection, in whose holes the tubes (3) which convey the gas to the distributors are fixed, in the lower part, and the tubes of the tube-bundle (6) and the distributors (7) themselves are fixed, in the upper part;

ii$_4$) a cylindrical casing (8), joined to the plate (5) by means of a flanged connection, having a height basically equal to the height of the tube-bundle (6), which in the lower part has one or more inlet nozzles (c) in a symmetrical posit ion for feeding the recirculated suspension (G1) (liquid produced and catalyst);

ii$_5$) a perforated plate (9), equipped with a group of perimetral slots (11) symmetrically arranged for the passage of the suspension and non-reacted gases, joined to the casing (8) by means of a flanged connection, in whose holes the tubes of the tube-bundle (6) are fixed, in the lower part, and the ducts (10) for conveying the non-reacted gases and suspension are fixed, in the upper part.

ii$_6$) a double-walled cylindrical casing (12), fixed to the plate (9) by means of a flanged connection, equipped on the internal wall with one or more feedthrough outlet nozzles (d) for discharging the cooling fluid (B2), the annular chamber (13) between the double wall being positioned in correspondence with the group of perimetral slots (11) present on the plate (9);

ii$_7$) a perforated plate (14), equipped with a group of perimetral slots (15) for the passage of the suspension and non-reacted gas, symmetrically arranged and coinciding with the annular chamber (13), joined to the double-walled casing (12) by means of a flanged connection and in whose holes the ducts (10) are fixed;

iii) a head (16), fixed to the plate (14) by means of a flanged connection, containing outlet nozzles (e) for discharging the liquid produced (G2) and outlet nozzles (f) for discharging the non-reacted gas (A2) and, in addition, a group of inclined transversal filters (17) for separating the particles of liquid and/or solid drawn thereinto.

According to the present invention, the reactor comprises at least one of the thermal exchange sections (ii$_3$)+(ii$_4$)+(ii$_5$), as illustrated from FIGS. 1 and 2. It is possible however to operate with a number of thermal exchange sections ranging from 2 to 6 arranged vertically on top of each other.

Figure 3:
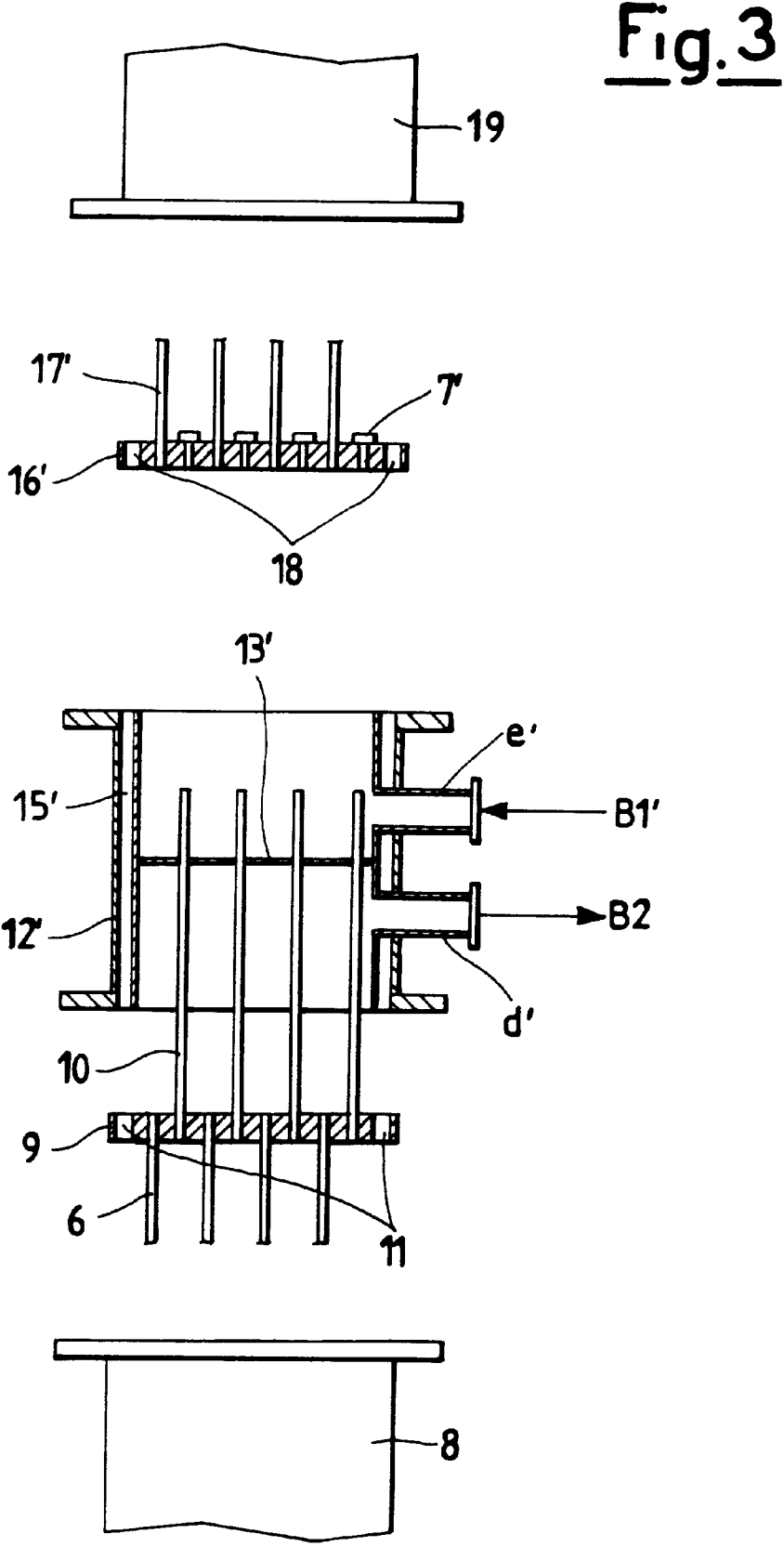

FIGS. 3 and 4 illustrate details relating to a reactor comprising two exchange sections vertically arranged on top of each other.

Therefore, with reference to FIGS. 1, 2, 3 and 4, the reactor of the present invention comprises the bottom head (1) into which the reagent gas is fed, through the inlet nozzle (a); the perforated plate (2); the tubes (3) for conveying the gas to the distributors (7); the cylindrical casing (4); the perforated plate (5); the tubes of the tube-bundle (6); the cylindrical casing (8) and the perforated plate (9) equipped with perimetral slots (11) and to whose holes the tubes of the tube-bundle (6) are fixed and also the ducts (10) which allow the passage of the non-reacted gas and suspension.

According to a variation of the present invention, which refers to a reactor which comprises two thermal exchange sections, (FIGS. 3 and 4), a double-walled cylindrical casing (12') is fixed to the plate (9), by means of a flanged connection, whose internal body is divided into two substantially equal volumes by a perforated diaphragm (13') into which the ducts (10) pass, having a length substantially equal to the height of the cylindrical casing (12') and which convey the non-reacted gas and the suspension, both to the annular chamber (15').

The lower volume of the casing (12'), below the diaphragm (13'), is connected to the outside by one or more outlet nozzles (d') through which the cooling fluid (B2) of the reaction zone/thermal exchange (8), is discharged. The upper volume of the casing (12'), above the diaphragm (13'), is connected to the outside of the reactor by one or more inlet nozzles (e') through which the cooling fluid (B1') of the reaction zone/thermal exchange above the casing (12') is fed.

A perforated plate (16'), equipped with perimetral slots (18) which are symmetrical and coinciding with the annular chamber (15'), is joined to the double-walled casing (12') by means of a flanged connection and the tubes of a tube-bundle (17') and possible distributors (7') are fixed in its upper holes.

The reactor with two thermal exchange sections of the present invention therefore comprises the cylindri- cal casing (19), having a height equal to that of the tube-bundle (17'), and the following end units:

a perforated plate (20), fixed to the casing (19) by means of a flanged connection, equipped with symmetrical perimetral slots (21), in whose holes the tubes of the tube-bundle (17') are fixed below, and ducts (22) for the passage of the nonreacted gas and suspension, above;

a double-walled cylindrical casing (23) fixed to the plate (20) by means of a flanged connection in which the annular section (24) coincides with the perimetral slots (21) of the plate (20), the internal wall of said cylindrical casing (23) has one or more feedthrough outlet nozzles (f') for discharging the cooling fluid (B2');

a perforated plate (25), joined to the double-walled casing (23) by means of a flanged connection, equipped with perimetral slots (26) which are symmetrical and coinciding with the annular chamber (24), and in whose holes the ducts (22) are fixed.

The reactor comprising two thermal exchange sections of the present invention terminates with a head (16), fixed to the plate (25) by means of a flanged connection, containing outlet nozzles (e) for discharging the suspension (G2) and outlet nozzles (f) for discharging the non-reacted gas (A2) and also a group of inclined filters (17) for separating the particles of liquid and/or solid drawn in.

What is claimed is:

1. A reactor for chemical reactions which are carried out in triphasic systems which comprises:
    a bottom head into which the reagent gas is fed, an inlet nozzle;
    a section having a bottom container and comprising:
        a first perforated plate, joined to the bottom container by means a flanged connection, and having first holes formed therein wherein tubes are attached to said first holes for conveying the gas to distributors;
        a first cylindrical casing, fixed to said first plate by means of a flanged connection, and one or more inlet nozzles is provided for feeding a cooling fluid;
        a second perforated plate, joined to said first cylindrical casing by means of a flanged connection, in whose holes the tubes which convey the gas to the distributors are fixed, below, the distributors themselves are fixed, above, and a plurality of tubes forming a tube bundle fixed, above;
        a second cylindrical casing, joined to the second plate by means of a flanged connection, having a height substantially equal to the height of the tube-bundle, which in a lower part has one or more inlet nozzles in a symmetrical position for feeding the recirculated suspension;
        a third perforated plate, equipped with a group of perimetral slots symmetrically arranged for the passage of the suspension and non-reacted gases, joined to the second casing by means of a flanged connection, in whose holes the tubes of the tube-bundle are fixed, below, and a plurality of ducts for conveying the non-reacted gases and suspension are fixed, above;
        a double-walled cylindrical casing, fixed to the second plate by means of a flanged connection, equipped on the internal wall with one or more feed-through outlet nozzles for discharging the cooling fluid, the annular chamber between the double wall being positioned corresponding with the group of perimetral slots present on the third plate;
        a fourth perforated plate, equipped with a group of perimetral slots for the passage of the suspension and non-reacted gas, symmetrically arranged and coinciding with the annular chamber, joined to the double-walled casing by means of a flanged connection and the holes of which the ducts are fixed;
        a head, fixed to the fourth plate by means of a flanged connection, containing outlet nozzles for discharging the liquid produced and a plurality of outlet nozzles for discharging the non-reacted gas and, a group of inclined transversal filters for separating the particles of liquid and/or solid drawn thereinto.

2. The reactor according to claim 1, wherein said section comprises one or more thermal exchange sections.

3. The reactor according to claim 1 or 2, wherein said section comprises two thermal exchange sections.

4. The reactor according to claim 3, which comprises, in addition to the sections: a double-walled cylindrical casing, fixed to the second plate, by a flanged connection, a perforated diaphragm for dividing an internal body portion in said casing into two substantially equal volumes [by a perforated diaphragm into which a plurality of ducts pass, having a length substantially equal to the height of the double-walled cylindrical casing, which convey the non-reacted gas and the suspension, both to the annular chamber, the lower volume of the double-walled casing, below the diaphragm, being connected to an outside location by one or more outlet nozzles through which the cooling fluid of the reaction zone/thermal exchange, is discharged, whereas the upper volume of the double-walled casing, above the diaphragm, is connected to the outside of the reactor by one or more inlet nozzles through which the cooling fluid of the reaction zone/thermal exchange above the casing is fed;
    a perforated plate (16'), equipped with perimetral slots (18) which are symmetrical and coinciding with the annular chamber (15'), joined to the double-walled casing (12') by means of a flanged connection and in whose holes, the tubes of a tube-bundle (17') and the distributors (17') are fixed, above;
    a cylindrical casing (19), having a height equal to that of the tube-bundle (17'), and the following end units:
    a perforated plate (20), fixed to the casing (19) by means of a flanged connection, equipped with symmetrical perimetral slots (21), in whose holes the tubes of the tube-bundle (17') are fixed below, and ducts (22) for the passage of the non-reacted gas and suspension, above;

a double-walled cylindrical casing (23) fixed to the plate (20) by means of a flanged connection in which the annular section (24) coincides with the perimetral slots (21) of the plate (20), the internal wall of said cylindrical casing (23) has one or more feedthrough outlet nozzles (f) for discharging the cooling fluid (B2'); a perforated plate (25), joined to the double-walled casing (23) by means of a flanged connection, equipped with perimetral slots (26) which are symmetrical and coincide with the annular chamber (24), and in whose holes the ducts (22) are fixed;

a head (16), fixed to the plate (25) by means of a flanged connection, containing outlet nozzles (e) for discharging the suspension (G2) and outlet nozzles (f) for discharging the nonreacted gas (A2) and also a group of inclined transversal diaphragms (17) for separating the particles of liquid and/or solid drawn in.

\* \* \* \* \*